Figure 1:
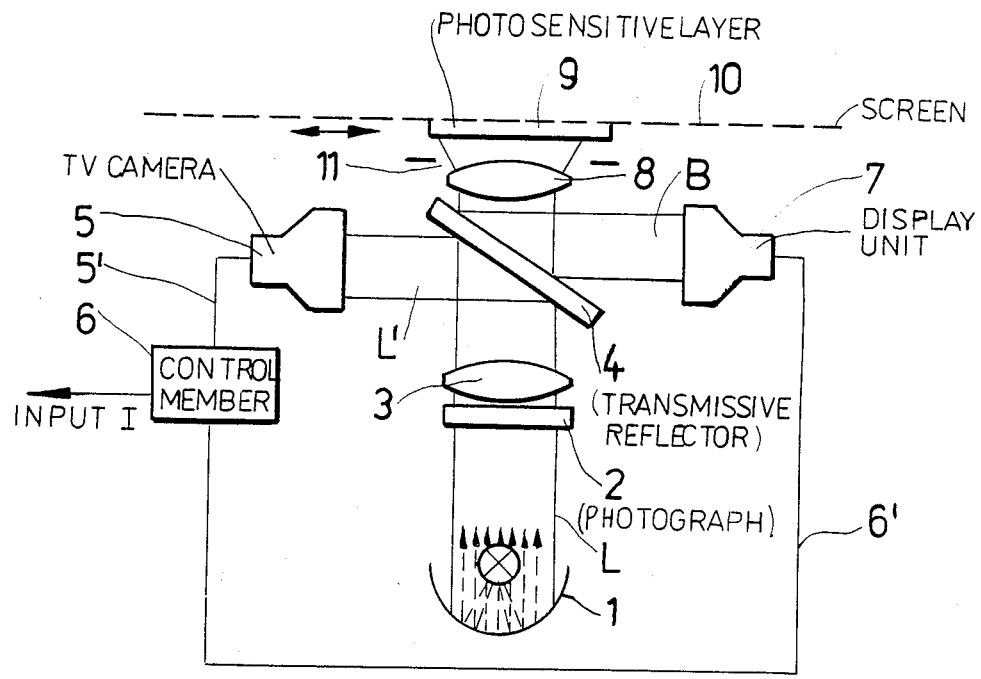

United States Patent [19]

Diete

[11] Patent Number: 4,580,167
[45] Date of Patent: Apr. 1, 1986

[54] DEVICE FOR AND METHOD OF PRODUCING PHOTOGRAPHS OF CONTROLLED CONTRAST

[76] Inventor: Norbert Diete, 5, H.-Matern-Strasse, 6902 Jena-Lobeda, District of Gera, German Democratic Rep.

[21] Appl. No.: 533,911

[22] Filed: Sep. 20, 1983

[30] Foreign Application Priority Data

Oct. 1, 1982 [DD] German Democratic Rep. ... 243698

[51] Int. Cl.[4] .................. H04N 5/84; H04N 9/12; H04N 1/387
[52] U.S. Cl. ................... 358/169; 358/97; 358/237; 358/302
[58] Field of Search ........ 358/169, 97, 237, 226, 358/302, 250, 183

[56] References Cited

U.S. PATENT DOCUMENTS

| 3,567,852 | 3/1968 | Ett | 358/93 |
| 3,576,945 | 5/1971 | Ebeling | 358/93 |
| 4,170,025 | 10/1979 | Benkley | 358/169 |
| 4,204,229 | 5/1980 | Heuze | 358/169 |

FOREIGN PATENT DOCUMENTS 140804 10/1978 Fed. Rep. of Germany .
345797 5/1960 Switzerland .

*Primary Examiner*—Tommy P. Chin

[57] ABSTRACT

A device for producing photographs of controlled contrast wherein a negative to be copied is evenly illuminated by a light source, the image thereof is directed by an optical member to an image detecting and conversion unit which produces a "non-sharp mask" of said negative under control of a respective control unit. Both, the "non-sharp mask" of the image and the image of the negative are directed into an image plane where they are superimposed and exposed upon a photo sensitive material.

6 Claims, 2 Drawing Figures

DEVICE FOR AND METHOD OF PRODUCING PHOTOGRAPHS OF CONTROLLED CONTRAST

The invention relates to a device for producing contrast controlled copies of photographs, particularly, for use in photogrammetry predominantly but not exclusively for balance of contrast in measuring photographs and in electro-optical copying devices.

The previous technical solutions with balance of contrast are based on the spot scanning of an image pattern, mostly a negative where the scanning light spot also produces the image copy.

The Swiss Pat. No. 345797 discloses a device which uses an intensity controlled cathode ray tube for scanning an object.

The DD WP No. 140804 discloses a device for producing contrast controlled copies without employing a cathode ray tube since the latter is bulky and requires an expensive current supply.

A liquid crystal matrix is used which effects the negative to be contrast controlled according to the dodging principle.

Dodging as refered to hereinafter is a term from photocopying as explained by "Manual of Photogrammetry", 4th edition 1980, of the American Society of Photogrammetry and is concerned with a "non-sharp mask".

Light which passes through certain parts of a negative is held back either manually or by electronic means.

In said DD Patent the image pattern is scanned with a light bundle of variable intensity.

The known technical solutions are disadvantageous in particular when using a cathode ray tube since the smallest detail of a copy to be reproduced identifiable by the contrast control depends on the smallest light spot diameter feasible, which cannot be reduced unlimitedly.

It is further known to use contact copying, that is, the pattern to be copied and the sensitive material are arranged adjacently in the path of beams.

This arrangement only permits a 1 to 1 copy, rather than an instantaneous reduction or magnification of the pattern.

It is an object of the present invention to obviate the above disadvantages.

It is a further object of the invention to provide a device for contrast control which is simple and compact and which permits a reduction or magnification of a pattern to be copied in the course of a copying procedure.

It is still a further object of the invention to provide a universally applicable device for contrast control which permits a local separation of a pattern to be copied from a copying plane.

It is still a further object to reduce the limitations which are given by the fact that the smallest detail identifiable by the contrast control in the copying procedure depends on the light spot diameter.

These and other objects are realized in a device for producing contrast-controlled copies of a photograph (negative or positive) comprising subsequently about a path of beams produced by a light source for evenly illuminating a pattern to be copied; said pattern, a projection lens and a light sensitive layer arranged in a copying plane.

According to the invention a reflecting member is provided in the path of beams between the pattern to be copied and the copying plane, which member reflects the light to an image recording device, which via a control unit is connected to a plane image reproduction device. Furthermore, means are provided for directing the image of the reproduction device into the copying plane.

Preferably, the image recording device and the image reproduction device have a common optical axis which intercepts the path of beams. The reflecting member is a partially transmissive plane reflector which is inclinedly arranged in the point of interception of said optical axis and said path of beams at an angle which permits reflection of the image of said image reproduction device into the copying plane. The ratio of reflected and transmitted radiation of the plane reflector is determined by the sensitivity of the image recording device, of the light sensitive layer and by the luminous power of the light source used and of the image reproduction device and by the mutual relation of these factors.

Any feasible interfering radiation from the image reproducing device to the image recording device is eliminated by a respective embodiment of the reflector so that the latter entirely reflects all incident radiation from the image reproducing device.

Furthermore, optical means for varying the image format are provided in the path of beams between the pattern to be copied and the copying plane.

In a further advantageous embodiment the reflecting member can be pivoted out of the path of beams. An image storage is inserted into the signal connection between the image recording device and the plane image reproducing device, the reflecting member is a plane reflector inclined relative to the path of beams, which is highly reflecting on the reflector face in opposition to the light source, and wherein the even illumination of the pattern to be copied is realized by the bright-switched plane image reproducing device.

The method of carrying out this embodiment comprises the steps of recording the image of the pattern to be copied reflected at the reflecting member by the image recording unit, varying the brightness and contrast of said image by the control unit, and storing the varied image in the intermediate storage, subsequently pivoting the reflecting member out of the path of rays, and producing a dodged standing image on the two-dimensional image reproducing device, which is projected via the pattern to be copied into the copying plane.

Advantageously, a tv-camera is employed as an image recording device and a tv-tube as a two-dimensional reproduction device.

Figure 2:
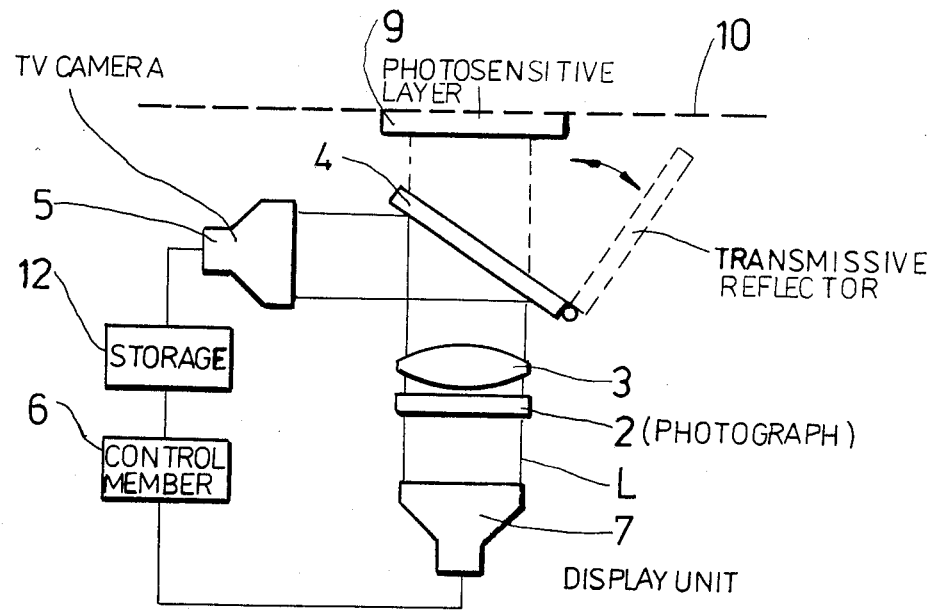

In order that the invention may be more readily understood reference is made to the accompanying drawings which illustrate diagrammatically and by way of example two embodiments thereof and where FIG. 1 is a device for producing contrast controlled copies of photographs employing a telecentric light source, and FIG. 2 is an embodiment of the device according to the invention employing a pivotable reflector.

In FIG. 1 a device for producing contrast controlled copies from, for example, aerial photographs or terrestrial photographs comprises a telecentric light source 1 which produces a light beam L which evenly illuminates a negative 2 of such a photograph.

In said light beam L the negative 2 is followed by a projection lens 3, a magnifying/demagnifying lens 8, a light stop 11 and a light sensitive layer 9 in a projection plane 10. A plane and partially transmissive reflector 4 is inserted into the beam L between said lens 3 and said lens 8. The members 2,3,4,8,9 are in mutual optical alignment. The plane and partially transmissive reflector 4 includes an angle with the beam L which is different from 90°. The reflector 4 serves to deviate a portion L' from the light beam L substantially at right angles to the light beam L.

A tv-camera 5 is arranged at spaced relation to the reflector 5 in the beam L'. The tv-camera 5 is connected via a signal line 5' to a control member 6 which, in turn, is connected via a signal line 6' to a display unit 7.

The latter is arranged substantially at right angles to the beam L in opposition to the reflector 4 remote from said tv-camera 5. The tv-camera 4, the reflector 4, and the display 7 are arranged in a common plane.

The display 7 produces an image beam B which is directed via said reflector 4, through said lens 8 and said light stop 11 into the copying plane 10.

In operation, the light source 1 emits the light beam L which evenly illuminates the photo negative 2 to be copied.

The image of the negative 2 is projected via the projection lens 3 upon the partially transmissive reflector 4 which, according to its inclination towards the beam L reflects a portion L' of the beam L to the tv-camera 5 which converts the image of the negative 2 into corresponding signals.

The portion of the beam L which passes the reflector 4 impinges on the copying plane 10 via the lens 8 which is in FIG. 1 a magnification lens. The photosensitive layer 9 has been removed before from out of the plane 10 by the operator.

Thus an image of the negative 2 can be observed by the operator on the plane 10 which serves in this case as a screen, at the same time the signal converted negative 2 is fed via the line 5' into the control unit 6 which includes an inverter. The latter produces a corresponding inverted signal which is fed into the display unit 7 via the signal line 6' where a respectively inverted image of the negative 2 is derived from the signal. By the reflector 4 the inverted negative 2 is directed upon the screen 10, where simultaneously the negative 2 image via the beam L and the inverted negative image via the beam B are superimposed and can be observed by the operator who, according to the desired contrast controls the resulting image on the screen 10 via an input I of the control member 6, in particular the intensity of the display 7 and sharpness of the tv-camera 5 are adjusted until a "dodged" image results on the screen 10. The inverted negative image of the display 7 is of a desired "non-sharpness", its light intensity is about one third of the light intensity of the photo negative 2. It is adjusted by the operator via the input I of the member 6. It is selfunderstood that the negative image and the inverted negative image are substantially in coincidence in the plane 10. Then the operator blanks out the light beams L and B by operating the light stop 11, inserts the photo sensitive layer 9 into the path of the beams B and L on the screen 10, opens the light stop 11 and exposes the photosensitive layer 9 with the "dodged" image for the desired exposure time.

In the device of FIG. 2 like numerals refer to like components.

Apart from the components described hereinbefore, a plane reflector 11, tiltable out of the path of rays L is provided between the projection lens 3 and the copying plane 10. An image storage 12 is connected to a display tube 7 via the control unit 6.

The display tube 7 also serves as a light source to evenly illuminate the negative 2. At first the display tube 7 is bright controlled and, hence, produce an image of the negative 2 reflected by the plane reflector 11 to the tv-camera 5 which again converts the image into corresponding electrical signals, which are stored in the storage 12. The tv-camera is switched off and the display 7 is switched to "display". The buffered negative image (electrical signals) is fed via the control member 6 into the display 7 and while observing the negative image on the display 7 the operator adjusts the desired "non-sharp mask" or "dodged" image by operation of the member 6. In a next step the plane reflector 11 is pivoted out of the path of rays and the "non-sharp" image of the negative 2 is projected through the negative 2 into the copying plane 10 where the light sensitive layer 9 is exposed by the image of the negative 2 and of the non-sharp image of the negative.

Also in this case it is feasible to change the format of the copy by inserting a magnification and demagnification lens into the path of rays. The arrangement according to FIG. 2 permits production of 1:1 copies.

The invention is not restricted to the above embodiment. Thus the tv-camera can be substituted by any suitable means, such as vidicons or liquid matrix cell arrangements.

The image conversion performed by the members 5 and 6 is conventional tv-technics.

Hence, the negative 2 image is converted by the tv-camera 5 into image amplitude signals which are inverted by a negator unit in the member 6, the inverted image amplitude signals are amplified by a video-amplifier and the resulting signals are fed into the display unit and into the display unit deflection means via an amplitude modulator and a threshold unit.

Such an operation is widely known and needs no further explanation. Concerning the reflector 4, this is constituted of two reflecting faces parallel to one another, the rear sides of which are in mutual opposition. The reflector is partially transmissive/partially reflective to radiation from the light source 1, and reflective only to radiation from the display unit.

The reflector 4 can also be substituted by any other suitable means.

I claim:

1. A device for producing photographs of controlled contrast in copying procedures, particularly for use in photogrammetry comprising in mutual optical alignment
    a light source for emitting a bundle of parallel light, subsequently along the same axial of said bundle of parallel light,
    a photograph to be copied,
    a projection lens,
    a partially transmissive reflector,
        said reflector including an angle with said bundle of parallel light,
        said angle being different from 90°,
        said reflector having two reflective faces in parallel to one another,
    a projection plane, coinciding with the projector plane of said projection lens, and
    a light sensitive material being arranged in said projection plane,
    an image detecting and conversion means, said image detecting and conversion means being arranged in spaced opposition to said reflector substantially at right angles to said bundle of parallel light, said reflector directs at least a portion of said bundle of parallel light to said image detecting and conversion means, a display unit, a control unit, said control unit being electrically connected to said image detecting and conversion means and to said display unit, said bundle of parallel light produces an image of said photograph, said reflector directs said image upon said image detecting and conversion means, said image detecting and conversion means converts said image into electrical signal, said control unit inverts said electrical signal for producing an inverted image, which is a "non-sharp mask" signal of said image, said display unit converts said "non-sharp" mask signal into a non-sharp mask image, said display unit being arranged in spaced opposition to said reflector remote from said image detecting and conversion means substantially at right angles to said bundle of parallel light, said display unit, said reflector and said image detecting and conversion means being arranged in a common plane, a further portion of said bundle of parallel light passes said partially transmissive reflector and produces a further image of said photograph in said projection plane, said "non-sharp mask" image of said display unit is reflected by said partially transmissive reflector in superposition to said further image produced by said further portion of said bundle of parallel light, said non-sharp mask image and said further image of said photograph produces a dodged image in said projection plane, said dodged image exposes said light sensitive material.

2. A device as claimed in claim 1, wherein said light source is a display unit.

3. A device as claimed in claim 2, wherein said reflector is removeably arranged in said bundle of parallel light.

4. A device as claimed in claim 3, wherein a storage is inserted into the electrical connection between said image detecting and conversion means and said control unit.

5. A device as claimed in claim 1, wherein said control unit has at least one input for external control, said input serves an operator to adjust via said control unit said non-sharp mask image and said image of said photograph, while observing the same in said projection plane before exposure.

6. A device as claimed in claim 4, wherein said control unit has at least one input for external control, said input serves an operator to adjust via said control unit said non-sharp mask image and said image of said photograph, while observing the same in said projection plane before exposure.

* * * * *